March 10, 1959 J. E. LOEFFLER ET AL 2,877,287
ELECTRICAL SWIVEL ASSEMBLIES
Filed May 7, 1956 4 Sheets-Sheet 1

John E. Loeffler
George D. Hall
INVENTORS

BY J. Vincent Martin
Joe E. Edwards
B. R. Pravel
ATTORNEYS

March 10, 1959 J. E. LOEFFLER ET AL 2,877,287
ELECTRICAL SWIVEL ASSEMBLIES
Filed May 7, 1956 4 Sheets-Sheet 2
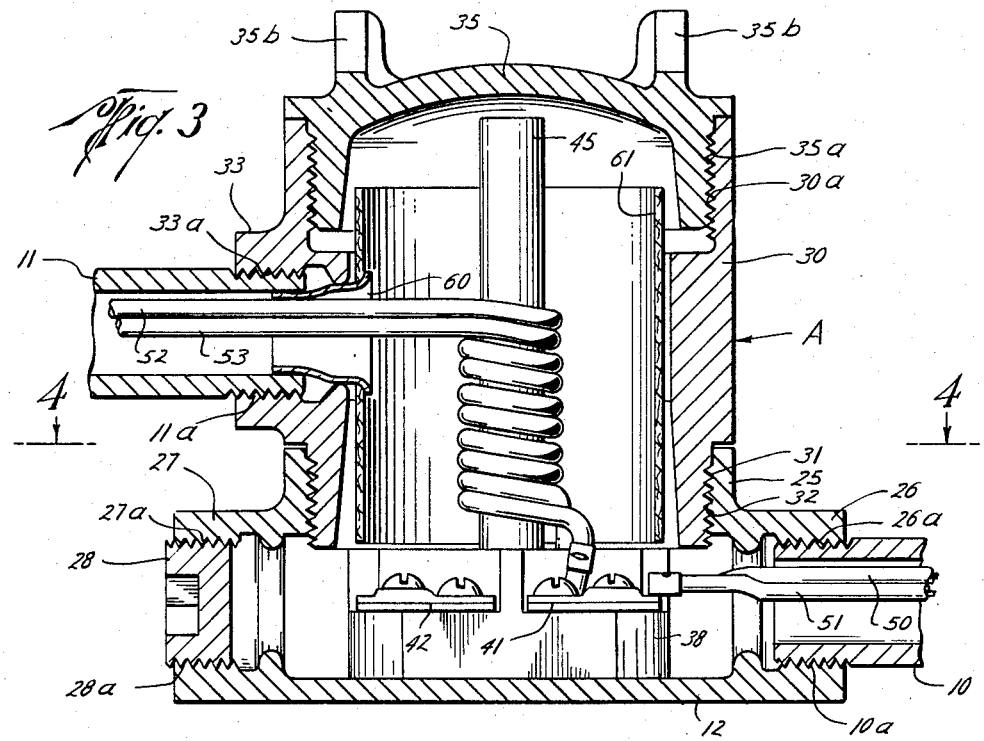
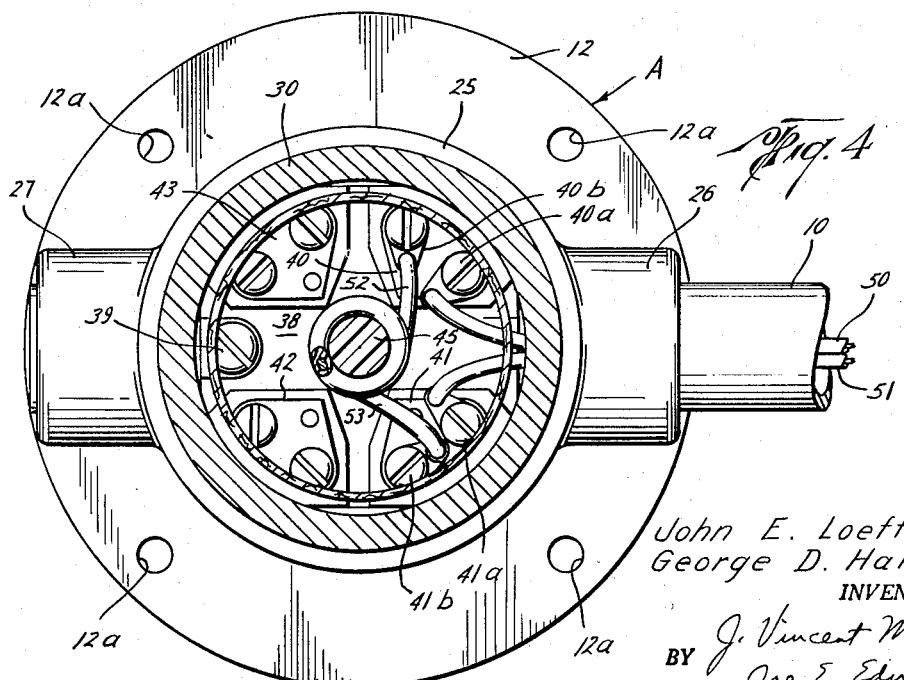
John E. Loeffler
George D. Hall
INVENTORS
BY J. Vincent Martin
Joe E. Edwards
B. R. Pravel
ATTORNEYS

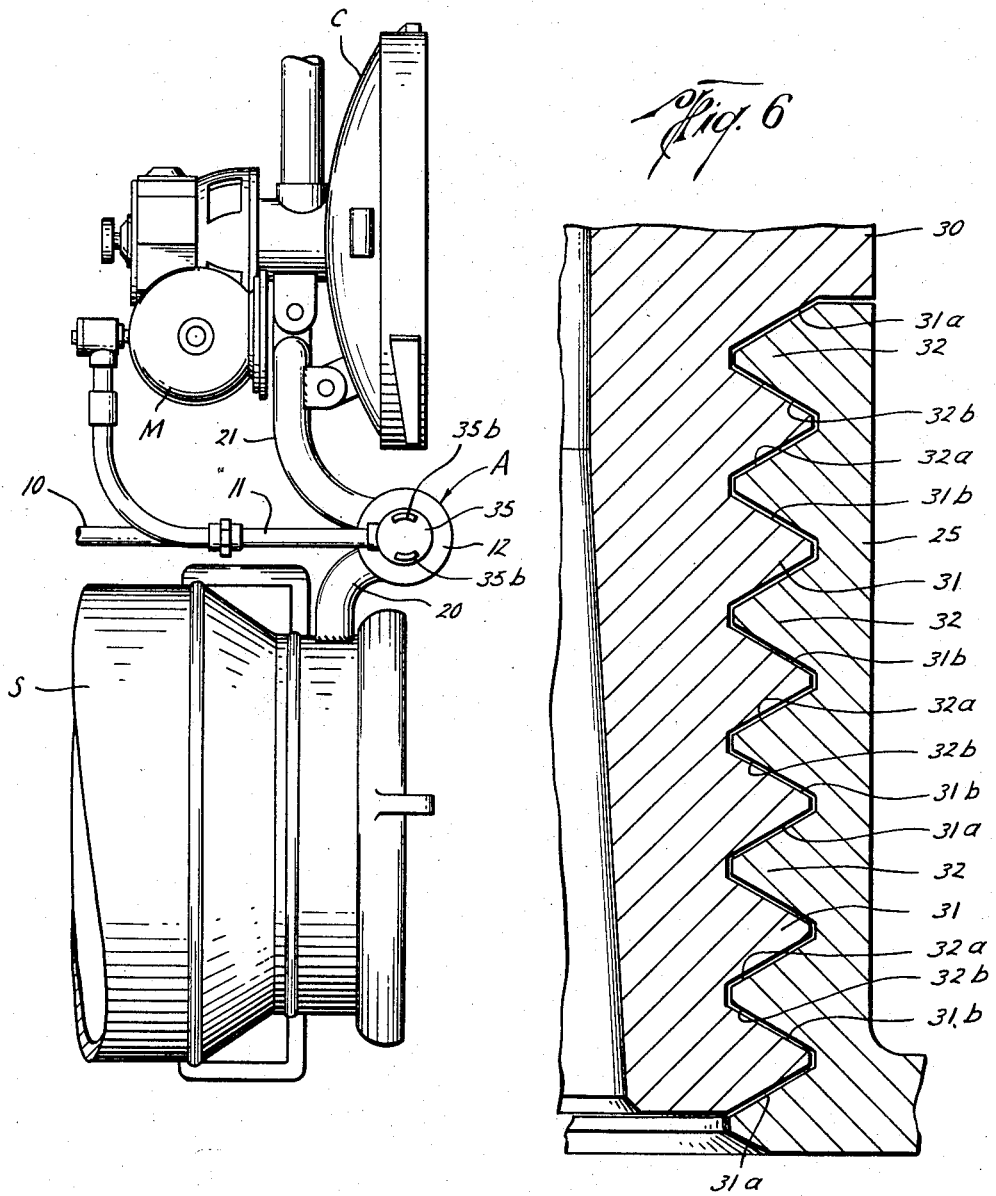

March 10, 1959  J. E. LOEFFLER ET AL  2,877,287
ELECTRICAL SWIVEL ASSEMBLIES
Filed May 7, 1956  4 Sheets-Sheet 4
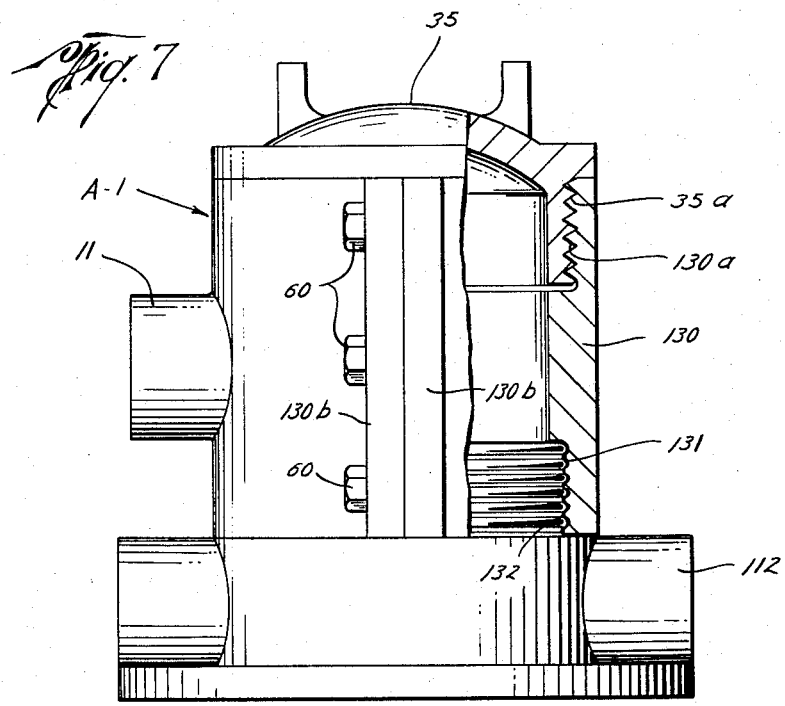
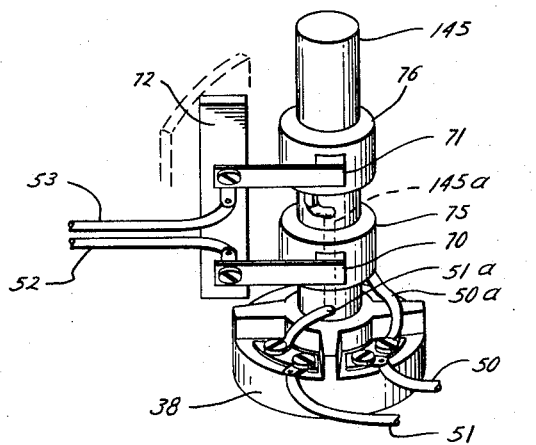
John E. Loeffler
George D. Hall
INVENTORS
BY J. Vincent Martin
Joe E. Edwards
B. R. Pravel
ATTORNEYS

United States Patent Office 2,877,287
Patented Mar. 10, 1959

2,877,287

ELECTRICAL SWIVEL ASSEMBLIES

John E. Loeffler and George D. Hall, Houston, Tex., assignors to Thornhill-Craver Company, Inc., Houston, Tex., a corporation of Texas Application May 7, 1956, Serial No. 583,304

8 Claims. (Cl. 174—86)

This invention relates to new and useful improvements in electrical swivel assemblies.

It is sometimes necessary to provide an electrical circuit between a stationary structure such as a strainer shell or body, and a movable structure such as a cover or lid hinged to such stationary strainer shell or body. In some cases, this may involve the supplying of electrical power to a power-consuming device such as an electrical motor located on the cover or lid or other movable structure. The frequent opening and closing of the cover, lid or other movable structure may result in serious wear of the electrical wires used to supply power to the motor or other power-consuming device.

In the usual case, a flexible fitting between the stationary structure and the movable structure is provided for housing or enclosing the electrical wires leading from the stationary structure to the movable structure. Such flexible fittings have several limitations and disadvantages. Experience has demonstrated that flexible fittings are not suitable for instances wherein the movable structure moves through an arc greater than about 45° relative to the fixed or stationary structure. Thus, in instances where a cover or lid is to be moved through an arc of about 180° or more, the usual flexible fittings are completely unsuitable. In addition, when the movements of the movable structure relative to the fixed structure is through an arc greater than about 45°, a greater length of the flexible fitting is required, which results in the use of a bulky unwieldy harness to support the flexible fitting to prevent its damage during use. Such a harness is itself very difficult to protect from damage during the shipment of the equipment, and its bulkiness makes it susceptible to damage even when the equipment is installed for operation.

Most flexible fittings are provided with a corrugated bronze inner tube which may be cracked or split by being overstressed or by fatigue failure and therefore such fittings are not reliable as explosion-proof enclosures. The braided covering of fine bronze wires that is also ordinarily used with such fittings is likewise subject to fraying by repeated flexings caused by the movement of the movable structure relative to the fixed structure so as to also prevent the flexible fittings from being explosion-proof after relatively short periods of time. Because such fittings are made up of several layers, it is extremely difficult to inspect same to determine whether or not an explosion-proof condition exists at any one time.

An object of this invention is to provide a new and improved electrical swivel assembly which eliminates or minimizes the disadvantages of the usual flexible fittings for enclosing electrical wires leading from a stationary structure to a movable structure.

An important object of this invention is to provide a new and improved electrical swivel assembly wherein a reliable explosion-proof housing or enclosure is provided for electrical wires leading from a fixed or stationary structure to a movable structure.

Another object of this invention is to provide a new and improved electrical swivel assembly wherein electrical wires extending from a fixed or stationary structure to a movable structure are enclosed in a housing which is so constructed that the movable member is adapted to move through an arc greater than 45° and through arcs of the magnitude of 180°, without causing appreciable wear of the electrical wires over extended periods of time.

Another object of this invention is to provide a new and improved electrical swivel assembly which is explosion-proof and can be readily inspected to determine the condition of the electrical wires in the assembly to ascertain whether such wires are defective.

Another object of this invention is to provide a new and improved apparatus for connecting electrical wires between a stationary structure such as a strainer body or shell and a movable structure such as a cover or lid hinged to such body or shell, wherein the stationary structure and the movable structure may be separately manufactured and later assembled, and wherein the electrical wires extending from the stationary structure to the movable structure may be readily connected after the movable structure is assembled on the stationary structure.

Another object of this invention is to provide a new and improved electrical swivel assembly for enclosing electrical wires leading from a stationary structure to a movable structure which is explosion-proof and which has means for permitting the venting of explosion gases from the enclosure if an explosion occurs within the enclosure, while still permitting a swiveling action thereof upon movement of the movable structure relative to the stationary structure.

Another object of this invention is to provide a new and improved apparatus for enclosing electrical wires leading from a stationary structure to a cover hinged thereto, wherein the enclosure apparatus is of a non-flexible construction but is capable of a swiveling movement for permitting the swinging of the hinged cover relative to the stationary structure.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 3 is a vertical sectional view illustrating the details of the electrical swivel assembly of this invention.

Figure 4 is a horizontal sectional view taken on line 4—4 of Figure 3.

Figure 5 is a view of the apparatus shown in Figures 1 and 2, but illustrating same with the hinged cover in an open position.

Figure 6 is an enlarged fragmentary sectional view illustrating in detail the threaded connection of the electrical swivel assembly shown in Figures 3 and 4.

Figure 7 is a view, partly in elevation and partly in section, illustrating a modified form of the electrical swivel assembly wherein the housing sections of the swivel assembly are connected by interlocking annular ribs and grooves.

Figure 8 is a perspective view illustrating a modified construction for connecting the wires internally of the swivel housing.

Figures 1, 2:
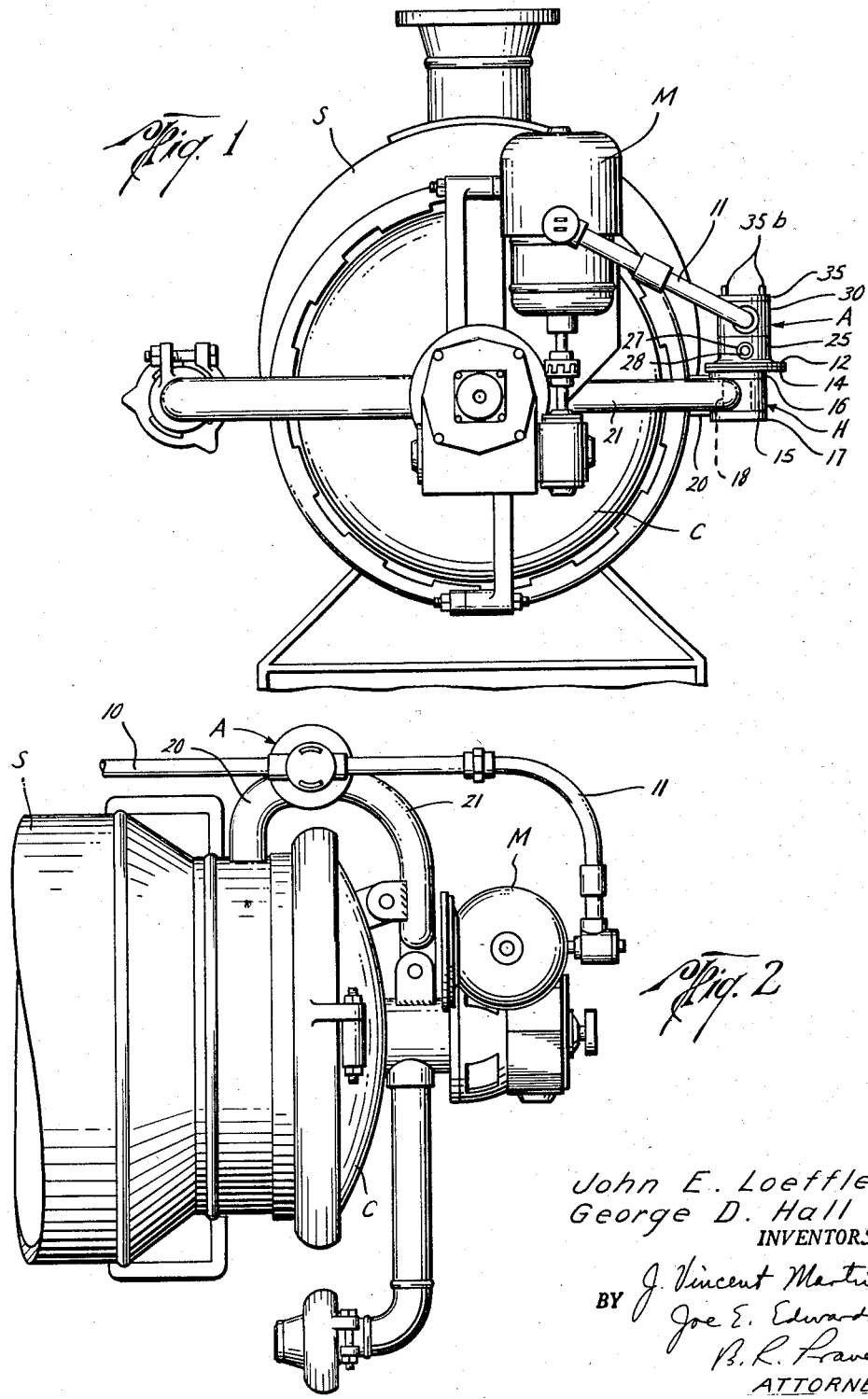
Figure 1 is an elevation illustrating the apparatus of this invention in use in connection with a hinged cover on a strainer body.
Figure 2 is a plan view of a portion of the apparatus illustrated in Figure 1.

In the drawings, the letter A designates generally the electrical swivel assembly of this invention. In Figures 1, 2 and 5, such electrical swivel assembly A is shown in position for use with a fluid-cleaning apparatus of the type disclosed in United States Patent No. 2,658,623, issued November 10, 1953, to Homer E. Thornhill, and wherein such fluid-cleaning apparatus has, generally speaking, a strainer shell or body S and a cover or lid C which is hinged to the shell or body S for swinging movement relative thereto. A motor M is mounted on the cover C for movement therewith, and such motor M operates a spray nozzle (not shown) inside of the strainer shell S in the manner described in said U. S. Patent No. 2,658,623. As will be explained in detail, electrical wires are led from a stationary conduit 10 through the explosion-proof assembly A and a movable conduit 11 to the electrical motor M without requiring the use of conventional flexible fittings. The electrical swivel assembly A of this invention also permits the swinging of the cover or lid C through an arc of about 180° without causing any appreciable wear on the electrical wires or the enclosure for same, whereby the assembly A remains explosion-proof for an extended period of time.

Figures 3, 4 and 6 illustrate the details of the electrical swivel assembly A of this invention. Such assembly A includes a circular base 12 (Figures 3 and 4) which is mounted on and secured to a stationary circular plate 14 therebelow. Such attachment can be effected by bolts (not shown) passing through suitable openings 12a in the plate 12 and similar openings (not shown) in the lower plate 14. Such attachment could, of course, also be effected with other means such as welding, if desired. The plate 14 is mounted on the top of an hinge H which includes a rotatable collar or member 15 positioned between stationary guides 16 and 17 which have an hinge pin 18 secured thereto and extending through a central opening in the collar 15, whereby the collar 15 is adapted to rotate or move about the pin 18 and relative to the guides 16 and 17. The guides 16 and 17 are stationary since they are connected by an arm 20 to the strainer shell or body S. The rotatable collar or member 15 is connected to an arm 21 which is attached to the cover or lid C by any suitable means so that the cover or lid C is adapted to swing in an arc from its closed position (Figure 2) to its open position (Figure 5) by pivoting about the hinge pin 18. The cover or lid C thus moves through an arc of about 180 degrees from the closed position to the open position and, of course, moves back to the closed position through the same arc and about the hinge pin 18. It should be pointed out that the circular plate 14 is welded or otherwise secured to the stationary guide 16 so that the circular base 12 of the electrical swivel assembly A is held stationary against movement during the swinging of the cover or lid C to and from its closed and open positions.

A substantially circular upwardly extending wall 25 of a lesser diameter than the outside diameter of the circular plate 12 extends upwardly from the plate 12 and is formed integrally therewith or is suitably attached thereto. The upwardly extending wall 25 constitutes a lower swivel housing section which has its lower end closed by the circular base plate 12. Tubular sections 26 and 27 are also formed integrally with the circular base 12 and the vertical circular wall 25, as indicated in Figures 3 and 4, or are otherwise suitably secured. The tubular section 26 is threaded at 26a and receives in threaded engagement therewith the threads 10a of the conduit or pipe 10. Similarly, the tubular section 27 is threaded at 27a for receiving the threads 28a of a plug 28. The tubular section 27 is therefore not normally in use, but if it is desired to run electrical wires therethrough, the plug 28 is removed and suitable conduit or pipe (not shown) is substituted therefor.

A rotatable housing sleeve or cylinder 30 is positioned above the cylindrical wall or lower housing section 25 and is threaded thereto by the engagement of its external threads 31 with internal threads 32 on the wall 25. Such threads 31 and 32 are so constructed that they permit the escape of any explosion gases from the inside of the cylinder or sleeve 30. Thus, in Figure 6, the threads 31 and 32 are shown in the spaced position they assume during an explosion and during the release of the explosive gases from the interior of the sleeve 30. Such spacing of the threads 31 and 32 provides a relatively long and narrow path for the cooling of the hot explosion gases during their escape through that path so that the ignition of explosive mixtures in the atmosphere surrounding the swivel is prevented. During the normal use of the apparatus A, the downwardly and inwardly inclined surfaces 31a of the teeth 31 are usually resting upon the downwardly and inwardly inclined upper surfaces 32a of the teeth 32, and it is the force of the explosion which causes the threads 31 to move relatively to the threads 32 to unseat the surfaces 31a from the surfaces 32a as indicated by the spacing therebetween in Figure 6 to provide the relatively long and narrow path for the explosion gases. In the event the surfaces 31b and 32b are forced into contact by the explosion or otherwise, it will be evident that the explosive gases will follow an helical path between the surfaces 31a and 32a during their escape. Likewise, the gases may follow an helical path between the surfaces 31b and 32b if the surfaces 31a and 32a are in contact during the escape of the explosive gases.

The sleeve or cylinder 30 has a tubular section or opening 33 provided on one side thereof for receiving in threaded engagement therewith a conduit or pipe 11. The threaded engagement of the conduit or pipe 11 and the tubular section 33 is effected by the threads 11a and the internal threads 33a.

A closure cap 35 is mounted above the cylinder or sleeve 30 with its external threads 35a in threaded engagement with the internal threads 30a of the sleeve 30. Such threads 35a and 30a are made of a special fit in the same manner as described previously in connection with threads 31 and 32 so that when an explosion occurs, the explosive gases are permitted to escape through the relatively long and narrow space between such threads 35a and 30a to thereby cool same, as explained. The cap 35 is, of course, removable to permit access to the interior of the sleeve 30 for the purposes of connecting the electrical wires, as will be explained, and also for inspecting such wires. The removal and connection of the cap 35 to the sleeve 30 with the threads 35a and 30a is facilitated by the provision of lugs 35b. It should be noted that the housing sleeve 30 together with the cap 35 constitutes an upper swivel housing section which is rotatable relative to the lower swivel housing section 25 at the threads 31 and 32.

Within the enclosure provided by the upper and lower swivel housing sections, a circular terminal plate 38 which is preferably on a non-conducting or insulating material such as "Bakelite" is positioned upon the base 12. A screw 39 extends through the plate 38 and into the base 12 for attaching the plate 38 thereto, but of course any other suitable means of attaching the plate 38 to the base 12 can be used. The plate 38 has terminal plates 40, 41, 42, and 43 which are suitably connected thereto. A central post or rod 45 formed of "Bakelite" or other electrical insulation material extends upwardly from the plate 38 and is either formed integrally therewith or is suitably attached thereto so as to position the post 45 in the central area of the cylinder 30.

Electrical wires or leads 50 and 51 are connected to a source of electrical power (not shown) and are led through the conduit or pipe 10 to the electrical terminal screws 40a and 41a, respectively. Electrical wires 52 and 53 are similarly connected to electrical terminal screws 40b and 41b, respectively, and such wires 52 and 53 are coiled about the post or rod 45 and then are directed out of the cylinder 30 through the conduit or pipe 11. It can thus be seen that the electrical wires are readily connected within the electrical swivel assembly A because the terminal screws on the several terminal plates 40, 41, 42 and 43 are readily available when the cap 35 is removed. The terminal plates 42 and 43 are of course not used in the form of the invention shown, but they are available for additional electrical wires leading from the tubular section 27, if such are used. It should be pointed out that the wires 52 and 53 are preferably coiled about the rod 45 in a counterclockwise direction, as viewed from the top of Figure 3, so as to permit an uncoiling of same from the position shown in Figure 3 upon a rotation of the pipe 11, sleeve 30, and cap 35, relative to the base 12 and the wall 25, as will be explained. It should be noted that if the assembly A is used with a left-hand hinge (as viewed from Figure 1), the wires 52 and 53 are coiled in a clockwise direction or opposite to that direction illustrated in Figures 3 and 4, so that in all instances of use, the wires 52 and 53 are uncoiled upon an opening of the cover C or other movable object.

In order to prevent any contact of the wires 52 and 53 with the inside of the metal sleeve 30 or the tubular section 33, a fibrous electrical insulating tube 60 is pressed into the tubular section 33 and it, in turn, extends through an opening in a cylindrical electrical insulating sleeve 61 which is formed of an insulating material such as fish paper. Thus, the wires 52 and 53 cannot contact the metal parts of the electrical swivel assembly A.

In the operation or use of the electrical swivel assembly A, such assembly A is mounted in connection with the strainer shell or body S and the movable cover or lid C or similar apparatus, as previously explained. The electrical wires are led from a source of electrical power (not shown) which is stationary to the motor M which is mounted on the movable cover or lid C. The wires 50 and 51 are thus led through the pipe or conduit 10 from the source of electrical power and are electrically connected at terminal plates 40 and 41 to the wires 52 and 53 which extend through the conduit or pipe 11 to the electrical motor M. It is believed evident that the wires 50 and 52 in effect constitute a single wire and the wires 51 and 53 similarly constitute a single wire since they are electrically connected at the terminal 40 and 41, respectively.

During the operation of the motor M, the cover or lid C is in the closed position indicated in Figures 1 and 2. The wires 52 and 53 are wound around the post 45 as indicated in Figures 3 and 4. However, when it is desired to open the cover C to the open position shown in Figure 5, the conduit 11 moves with the cover C and motor M and such movement is transmitted to the upper swivel housing formed by the rotatable housing sleeve 30 and the cap 35 mounted thereon. Also, the internal tube 60 and sleeve 61 move with the housing sleeve 30. The lower swivel housing formed by the base 12 and the wall 25 is stationary since such structure is secured to the stationary support 14 and the stationary pipe or conduit 10. The threads 31 are therefore rotated with respect to the threads 32 during the swinging of the cover C relative to the shell or body S and the wires 52 and 53 unwind or uncoil to a certain extent to form an enlarged coil about the post 45 due to the fact that they are wound about the post 45 in a counterclockwise direction (as viewed from the top of Figure 3) which permits such unwinding or uncoiling.

On a swinging of the cover or lid C to the closed position, the wires 52 and 53 again wind up to a coil fitting relatively closely about the post 45 as shown in Figures 3 and 4, and the threads 31 and 32 are also threaded to the position shown in Figures 3 and 4. Thus, even though the cover or lid C is moved through an arc of approximately 180° to and from its open and closed positions, the coil of the wires 52 and 53 about the post 45 is only enlarged and reduced and the bending of the wires 52 and 53 is controlled to limit the stress to therefore prolong the service life of the wires. Also, even though the threads 31 and 32 are being rotated relative to each other during such opening and closing of the cover or lid C, the explosion-proof enclosure is still provided because the threads 31 and 32 are never disengaged and the narrow and extended path between the threads 31 and 32 is always provided for the escape and cooling of gases, should such an explosion occur within the swivel assembly A.

In Figure 7, a modified construction A-1 is illustrated wherein the threads 31 and 32 of Figures 1-6 have been replaced with annular ribs 131 on the base 112 which interfit with annular grooves 132 on the housing section 130. The ribs 131 are sufficiently undersize with respect to the grooves 132 to leave a long narrow escape path therebetween for explosive gases to be cooled during their escape. Also, for purposes of assembly, the housing section 130 is split into two halves which are joined at connecting flanges 130b by screws or bolts 60 which are threaded into the flanges 130b or are otherwise secured thereto. The rest of the assembly A-1 is the same as that illustrated in Figures 1-6 and like parts have the same numerals.

In Figure 8, a modified form of the connection of the electrical wires is illustrated. Such construction is positioned interiorly of the housing sections of the assembly A or A-1. The wires 50 and 51 are connected to the terminal plate or block 38 as described in connection with Figures 1-6. The wires 52 and 53 are connected to electrical brushes or contacts 70 and 71, respectively, which are mounted on a support 72 of electrical insulating material which is suitably mounted in the housing 30 for rotation therewith. The brushes 70 and 71 are in constant engagement with slip rings 75 and 76, respectively, which are made of electrical conducting material and are mounted on the post 145 formed of electrical insulation material. The slip ring 75 is electrically connected to the wire 50 by means of extension wire 50a, and similarly, the slip ring 76 is electrically connected to the wire 51 by means of extension wire 51a which preferably extends through an opening 145a in the post 145, in passing from the terminal plate 38 to the slip ring 71.

It is believed evident that upon a rotational movement of the upper housing section 30 relative to the lower housing section or base 12, the brushes 70 and 71 are moved with the section 30 and relative to the stationary slip rings 75 and 76, but the electrical connection between the wires 50, 51 and 52, 53 remains due to the constant engagement of the brushes 70 and 71 with the slip rings 75 and 76. Thus, with the form of the invention shown in Figure 8, even the uncoiling and recoiling of the electrical wires is eliminated.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An electrical swivel assembly for enclosing electrical wires leading from a vessel for confining a gas under super-atmospheric pressure to an electrical device on a closure cap pivotally mounted on the vessel, comprising a swivel housing having closed ends and being formed of first and second housing sections, telescoping parts on the two housing sections having a plurality of interengaging circumferentially extending ribs and grooves, said ribs and grooves providing for relative rotation between the parts and providing a long narrow escape passage for cooling explosion gases escaping from the interior of the housing, a first conduit means connecting one of said housing sections to said cap for leading the electrical wires from said electrical device to the interior of said housing and for imparting the movement of said cap to said one of said housing sections, and a second conduit means connecting the other of said housing sections to said vessel for leading the electrical wires from the interior of said housing to a source of electrical power, whereby said electrical wires remain enclosed within said housing and said conduits during relative rotation between the housing sections.

2. The structure set forth in claim 1, wherein said ribs and grooves connecting said housing sections are provided by interengaging threads on said housing sections.

3. The structure set forth in claim 1, including a post mounted in said housing for coiling said electrical wires around same to facilitate the coiling and uncoiling of said wires during the movement of the housing sections relative to each other.

4. The structure set forth in claim 1, including a removable cap at one end of said housing to provide access to the interior of the housing for the installation and inspection of the electrical wires therein.

5. The structure set forth in claim 1, including an electrical terminal base in the housing having electrical terminals, said wires leading through said conduits being electrically connected together within said housing at said terminals of said terminal base.

6. The structure set forth in claim 1, including stationary slip rings in said housing electrically connected to segments of the electrical wires, and an electrical contact brush electrically contacting each of said slip rings and having electrical connection with other segments of the electrical wires, said slip rings and brushes therewith effecting an electrical connection between the segments of the electrical wires while permitting relative movement of the segments of the wires during a relative rotation of the housing sections.

7. An electrical swivel assembly for enclosing electrical wires extending between a vessel for confining a gas under superatmospheric pressure and a closure cap for said vessel having an electrical device thereon comprising, a swivel housing formed of first and second housing sections, telescoping parts on the two housing sections having a plurality of interengaging circumferentially extending ribs and grooves, said ribs and grooves providing for relative rotation between the parts and providing a long, narrow escape passage for cooling explosion gases escaping from the interior of the housing.

8. Apparatus comprising: a vessel for confining a gas under superatmospheric pressure, a closure cap for said vessel; said cap pivotally mounted on the vessel for swinging movement relative thereto; an electrical device on the cap; electrical wires extending between said vessel and electrical device; and a swivel assembly for enclosing said wires comprising, a swivel housing having closed ends and being formed of first and second housing sections, telescoping parts on the two housing sections having a plurality of interengaging circumferentially extending ribs and grooves, said ribs and grooves providing for relative rotation between the parts and providing a long narrow escape passage for cooling explosion gases escaping from the interior of the housing, a first conduit means connecting one of said housing sections to said cap for leading the electrical wires from said electrical device to the interior of said housing and for imparting the movement of said cap to said one of said housing sections, and a second conduit means connecting the other of said housing sections to said vessel for leading the electrical wires from the interior of said housing to a source of electrical power, whereby said electrical wires remain enclosed within said housing and said conduits during relative rotation between the housing sections.

References Cited in the file of this patent
UNITED STATES PATENTS

| 282,317 | Hinds | July 31, 1883 |
| 2,063,234 | Ehrlich | Dec. 8, 1936 |
| 2,116,050 | Stock et al. | May 3, 1938 |
| 2,477,901 | Robboy | Aug. 2, 1949 |